POWER CONTROL CIRCUITS UTILIZING A BIDIRECTIONAL SEMICONDUCTOR

Filed Feb. 7, 1964 2 Sheets-Sheet 1

INVENTOR.
E. KEITH HOWELL
BY Melvin M. Goldenberg
ATTORNEY

POWER CONTROL CIRCUITS UTILIZING A BIDIRECTIONAL SEMICONDUCTOR

Filed Feb. 7, 1964 2 Sheets-Sheet 2

INVENTOR.
E. KEITH HOWELL
BY Melvin M. Goldenberg
ATTORNEY

United States Patent Office 3,310,687

Patented Mar. 21, 1967

3,310,687

POWER CONTROL CIRCUITS UTILIZING A BI-DIRECTIONAL SEMICONDUCTOR

E. Keith Howell, Skaneateles, N.Y., assignor to General Electric Company, a corporation of New York Filed Feb. 7, 1964, Ser. No. 343,298
12 Claims. (Cl. 307—88.5)

This invention relates to circuitry for the selective supply of alternating current power to a load. More particularly, the invention relates to the employment of bi-directional current conducting semiconductor devices for controlling the amount and frequency of alternating current power delivered to a load.

The continuous growth of electrically operated equipment in all fields of endeavor has focused attention upon the means used for supplying the power to such equipment. It is fully appreciated that not only the generation of electrical power but also its delivery to the equipment in usable form is important. Accordingly, considerable design effort has been concentrated on circuitry for suitably supplying power to a wide variety of load circuits. Among the great number of important characteristics that must be weighed in the selection of any particular power control circuit must be included the cost factor. This in turn may be broken down into the initial cost of construction, the operating costs, and the maintenance costs. Further characteristics include the space requirements of the circuit, the operating environment within which it must work, and the sensitivity and efficiency with which the circuit functions to accomplish a desired type of operation.

An object of the present invention is to provide improved power control circuitry exhibiting the characteristics of low cost, small size, and high reliability.

For obvious reasons, it is desirable to effect control over a maximum amount of supplied energy with a minimum amount of power dissipation in the control circuitry. Power dissipation may be attributed to both the particular components employed and to the number of such components required.

Another object of the present invention is to provide improved circuitry that is operative in response to low power control signals to effect control over the supply of relatively large amounts of energy.

Still another object of the invention is to provide improved power control circuitry using a minimum number of components and wherein each of said components is characterized by high reliability and relatively low power consumption.

The relatively recent development of semiconductor devices has provided a new dimension in the area of electrical equipment reliability, size, and power consumption. In the power supply and control field, the silicon controlled rectifier has provided particular advantages. Silicon controlled rectifiers are basically three-terminal semiconductor rectifiers operative to switch from a high to a low impedance state between two main terminals in response to a relatively short low power impulse on a gate terminal. In order to control the supply of alternating current power, two such devices, connected with opposing orientations, are generally interposed between the supply and a load. Control circuitry is used to selectively deliver independent triggering pulses to each device in accordance with a desired operating scheme. To reduce the cost and complexity of such arrangements, one of these controlled rectifiers may be eliminated by using a bridge circuit wherein four conventional rectifiers provide the bridge and a single controlled rectifier is connected across its output. Even though this technique reduces the required number of controlled rectifiers and perhaps the complexity of the triggering circuitry, it does so at the expense of added conventional rectifiers and added power loss in these rectifiers.

The invention of controlled bi-directional current conducting semiconductors has provided the answer to the need for simple control over the delivery of alternating current power. These semiconductors normally exhibit a high impedance characteristic between two main current carrying terminals. When a relatively low power triggering impulse is applied to a third or gate terminal, the device switches to a second state wherein a low impedance exists between the current carrying terminals. These semiconductors are bilateral in nature and permit current conduction in either direction with equal facility. Furthermore, the triggering impulses required to effect switching from a high to a low impedance state may generally be of either polarity. Obviously, the bilateral characteristic of the main current conducting path and the flexibility offered by the permissible forms of triggering impulses render the bi-directional current conducting semiconductors admirably suited for control of alternating current.

Another object of the present invention is to provide power control circuits employing bi-directional current conducting semiconductors.

A power supply circuit, to be most effective, should be tailored to the type of load supplied. The present invention is designed to supply alternating current power to loads exhibiting negative resistance characteritsics. Gaseous discharge lamps, such as mercury or fluorescent lamps, are examples of such loads. The power delivered to these loads must be of sufficient voltage magnitude to effect initial operation. After operation commences, however, the required sustaining voltage may be relatively low while means may be necessary for limiting the supplied current.

Another object of the present invention is to provide power control circuits using bi-directional current conducting semiconductors and operative to facilitate the supply of power to loads having negative resistance characteristics.

Considering fluorescent or mercury lamps as loads, it will be appreciated that the operating voltages of such devices may exceed the level of normally available supply voltages. Further, it is desirable to supply these loads with power of higher frequency than the comercially available 60 cycle/second power. The provision of higher voltage and frequency greatly enhances lamp operating efficiency and light output.

Another general object of the invention is to provide circuits employing bi-directional current conducting semiconductors operative to convert an alternating current input into an output having a different frequency and a higher voltage level than the input.

A more specific object of the present invention is to provide power control circuits for negative resistance loads using bi-directional current conducting semiconductors and delivering power to such loads at a higher voltage and/or frequency than that of the supply voltage.

As described hereinafter in conjunction with a number of illustrative embodiments, the invention basically comprises the unique combination of a bi-directional current conducting semiconductor with inductive and capacitive circuit elements to modify and control the power delivered to a load. The semiconductor is selectively triggered by control signals to determine the amount of energy supplied to the load and in a number of embodiments, double resonant circuits are used in conjunction therewith to increase the frequency of the energy so supplied. Several embodiments also show the use of bilateral current conducting semiconductors with ballast transformers in lamp dimming control circuits.

The features of the invention are set forth with particularity in the appended claims. The invention itself, however, both as to its organization and method of operation together with further objects and features thereof, may best be understood by reference to the following description taken in conjunction with the accompanying drawings wherein:

FIGS. 1A, 1B, and 1C illustrate respectively: a diagrammatic representation of one form of controlled bi-directional current conducting semiconductor, a symbolic representation for such a device, and typical characteristic operating curves of such a device;

Figure 7:
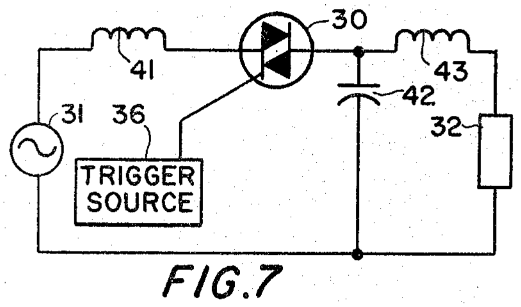
FIG. 7 is a circuit schematic illustrating an embodiment of the invention wherein alternating current is applied to a load via a double resonant circuit which includes a single controlled bi-directional current conducting semiconductor serially connected with the load.
Figure 9:
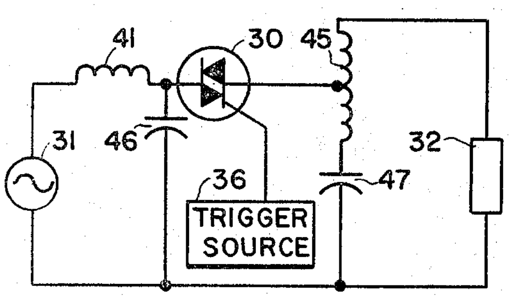
Figure 10:
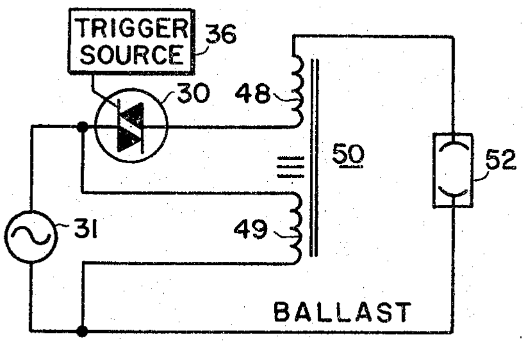
Figure 11:
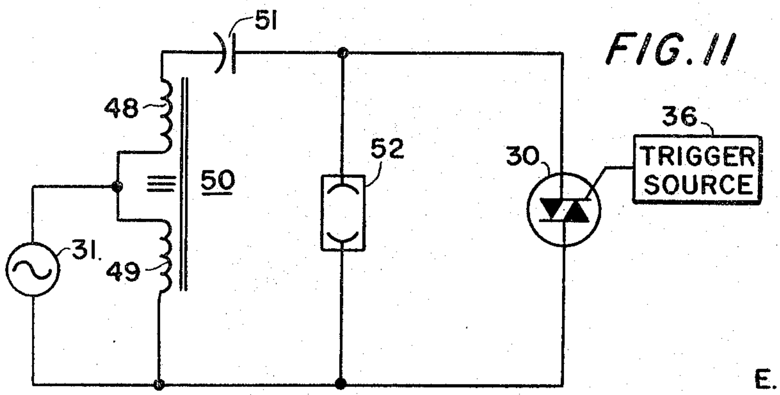

FIG. 9 is a circuit schematic illustrating a still further modification of the circuit shown in FIG. 7 wherein an additional capacitor is employed in order to permit the application of higher voltage pulses to the load; and FIGS. 10 and 11 are circuit schematics illustrating embodiments of the invention wherein controlled bi-directional current conducting semiconductors are employed in conjunction with ballast transformers to furnish controlled dimming of lamp loads.

*Controlled bi-directional current conducting semiconductors*

A general understanding of controlled bi-directional current conducting semiconductors (hereafter referred to as controlled bilateral devices) is required in order to understand and appreciate the invention as embodied in the illustrative circuits described hereinafter. Broadly speaking, these three-terminal devices can be constructed to furnish four modes of operation. The modes of operation differ in the direction of current flow between the main current conduction carrying terminals of the device and in the required direction of current flow into the trigger terminal of the device in order to make it switch from a high to a low impedance state. If the device is arbitrarily designated, as shown in FIG. 1B, to have main current carrying terminals (1) and (2) and a gate terminal (3), the following table represents the four possible modes of operation. In the table, $V_{(2)}$ is considered positive if terminal (2) is more positive than terminal (1), and $I_{(3)}$ is considered positive if current flows into gate terminal (3).

| Mode | $V_{(2)}$ | $I_{(3)}$ (for turn on) |
|---|---|---|
| 1 | + | + |
| 2 | − | − |
| 3 | + | − |
| 4 | − | + |

An examination of the above table makes it apparent that the devices may be switched to their low impedance state in either direction of conduction by triggering impulses of either polarity. Although each device may not be capable of operation in all four modes, the devices may be selectively constructed in order to furnish operation in any modes that are desired. Thus, for example, if it is wished to provide a device operative in the second and third mode, current conduction in either direction through the device may be triggered by impulses having a negative polarity only. On the other hand, if it is desired to operate in the first and second mode, triggering impulses having a polarity similar to that of the direction of conduction (as defined by the symbols used in the table) will be required.

Figure 1A:
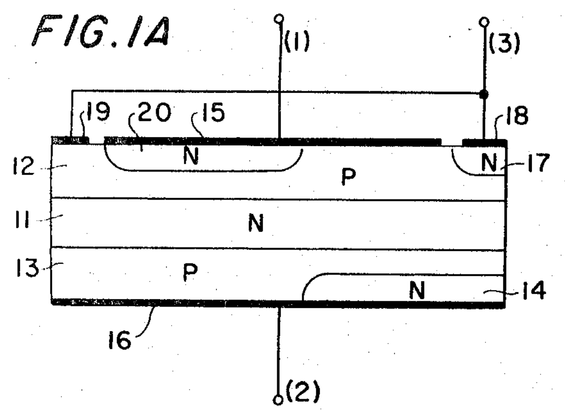
Figure 1B:
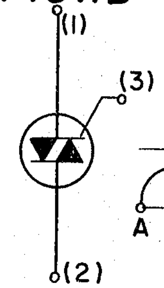

One example of a typical controlled bi-directional current carrying semiconductor is shown in FIG. 1A. This particular structure has been shown and described in detail in the co-pending patent application of F. W. Gutzwiller, Serial No. 331,776 filed December 19, 1963, now Patent No. 3,275,909, and assigned to the General Electric Company, assignee of the present invention. This device is designed to function primarily in the modes 1 and 2 set forth in the above table. Accordingly, when current carrying terminal (2) is negative with respect to current carrying terminal (1), the device is switchable to a low impedance state by supplying a current into gate terminal (3). When the reverse polarity is applied between the main terminals (1) and (2) the device is switchable to a low impedance state by extracting current from gate terminal (3). Stated another way, conduction from terminal (2) to terminal (1) may be initiated by the application of a positive signal to terminal (3) and conduction from terminal (1) to terminal (2) may be initiated by the application of a negative signal to terminal (3).

The device of FIG. 1A is a multi-layer device having in internal layer 11 of n conductivity type sandwiched by conductivity type layers 12 and 13. An n conductivity region 14 is formed adjacent or contiguous with an external portion of p layer 13 and an n conductivity type region 20 is formed adjacent or contiguous with an external portion of p layer 12. The n region 20 is only contiguous with a part of p region 12 and is spaced from the sides of the device to leave exposed surfaces of p region 12 on both lateral sides thereof. Electrical contacts for the main current conduction path through the device are provided by low resistance contacts 15 and 16 on the major faces thereof. Electrode 15 contacts the external n region 20 and the exposed portion of the next adjacent p layer 12, and consequently, shorts the p-n junction therebetween. Electrode 16 extends over external n layer 14 and the exposed portion of p layer 13 shorting the p-n junction therebetween. As shown in the figures, electrodes 15 and 16 define terminals (2) and (1) of the device respectively.

Figures 2, 3:
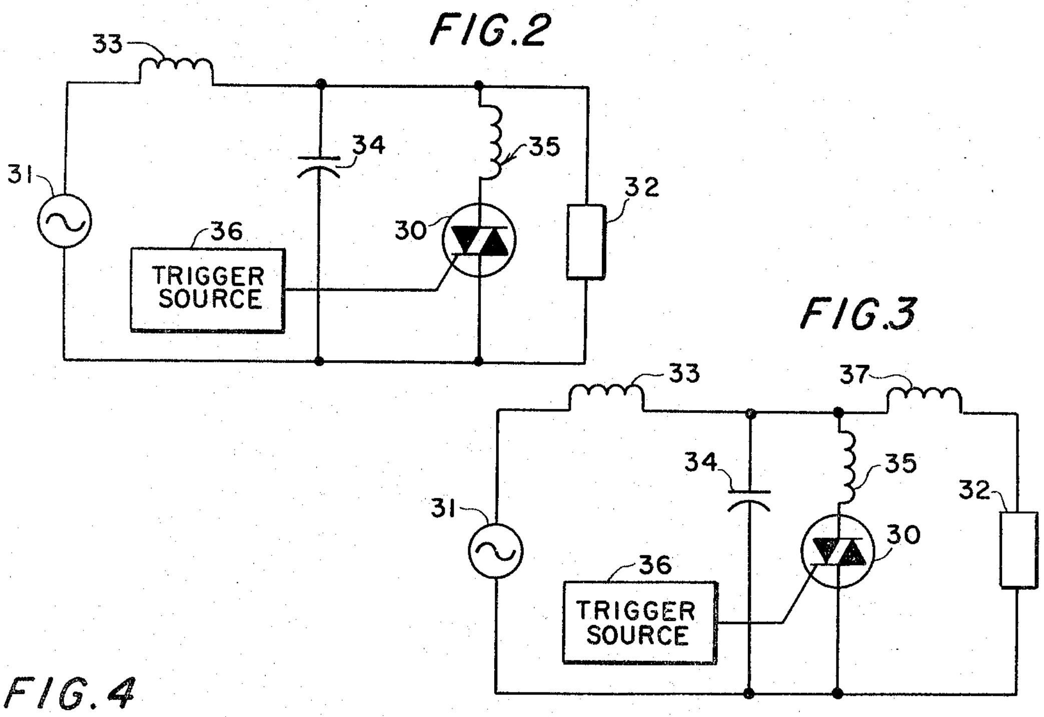
FIG. 2 is a circuit schematic illustrating an embodiment of the invention wherein alternating current is applied to a load via double resonant circuitry including a single controlled bi-directional current conducting semiconductor.
FIG. 3 is a circuit schematic illustrating an embodiment of the invention wherein alternating current is applied to a load via circuitry similar to that shown in FIG. 2, but supplemented by the inductive means to prevent power from the supply from being directly applied to the load.

It may be helpful to note that the device as thus far described constitutes a five layer semiconductor with shorted emitters and is essentially the five layer, two terminal bilateral switch described in the co-pending patent application of Holonyak et al., Serial No. 838,504, filed September 8, 1959, and assigned to the General Electric Company, assignee of the present invention. This latter device is shown in FIG. 2 and described hereinafter.

In order to establish control over the conduction between terminals (1) and (2) of the device in FIG. 1A, two gate connections are provided. First, an n conductivity type region 17 is established on an external portion of p layer 12 near electrode 15. A low resistance contact 18 is formed on this gate region and gate terminal (3) is connected thereto. Another contact is established with p layer 12 at a point electrically isolated from the junction between layers 17 and 12. This second contact is accomplished with electrode 19 which is also connected to terminal (3).

A general understanding of the operation of the controlled bilateral device shown in FIG. 1A will be available if one considers the device as being made up of two portions: the first portion comprising, electrodes 15 and 19, n layer 20, p layer 12, n layer 11, p layer 13, and electrode 16; and the second comprising, electrodes 15 and 18, n layer 17, p layer 12, n layer 11, p layer 13, n layer 14, and electrode 16. With this hypothetical division of the device it will be appreciated that the first portion represents a standard type silicon controlled rectifier and its functioning may be considered to be analogous to such a device. The second portion represents a remote gate silicon controlled rectifier and its functioning may be considered to be analogous to such a device. The operation and functioning of silicon controlled rectifiers is fully set out in numerous publications including the General Electric Controlled Rectifier Manual, second edition, copyright 1961 by the General Electric Company. The operation and functioning of the remote gate silicon controlled rectifier is fully described and illustrated in the co-pending patent application of F. E. Gentry et al., Serial No. 326,162, filed November 26, 1963, now Patent No. 3,284,680, and assigned to the General Electric Company, assignee of the present invention.

Figure 1C:
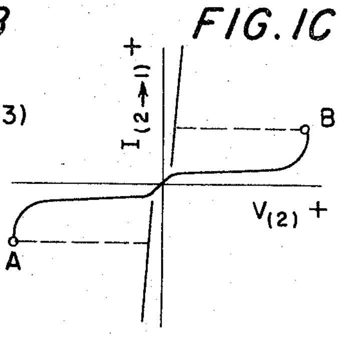

The operation of the device will be briefly considered in conjunction with the typical characteristic curves shown in FIG. 1C. In these curves current flow through terminals (1) and (2) is plotted as ordinates with flow from (2) to (1) being considered positive, and the instantaneous voltage on terminal (2) is plotted as abscissae.

When terminal (2) is positive relative to terminal (1) the two outer layers of the device in FIG. 1A tend to conduct because the p-n junction between layers 13 and 11 and the p-n junction between layers 12 and 20 are forward biased. On the other hand, the center n-p junction between layers 11 and 12 tends to block current flow through the device. This blocking condition may be removed by either raising the total voltage across the junction to a sufficiently high value to force conduction, or by introducing a sufficient amount of current through the gate terminal (3) and electrode 19 to cause a change in the charge condition across the junction. In operation, this is effectively what is done. Without going into a detailed recitation of the distribution and redistribution of electrons and holes within the device, it suffices to say that when sufficient gate current is supplied thereto the space charge at the blocking n-p junction between layers 11 and 12 collapses and within a short while, the device presents a low impedance path for current flow from terminal (2) to terminal (1).

This condition is illustrated in the first quadrant of the characteristic curves of FIG. 1C. Thus, when the voltage on terminal (2) is positive, an increase in the voltage does not cause an increased current until a "breakover voltage" and "breakover current" is attained at point B and avalanche multiplication begins. Beyond this point, the current increases rapidly until the center junction between layers 11 and 12 becomes forward-biased. At this time the device goes into a high conduction state. For increasing magnitudes of gate current into terminal (3), the region of the characteristic between the breakover voltage and the conduction voltage is narrower as the magnitude of the breakover voltage is reduced.

When the voltage on terminal (1) is positive with respect to the voltage on terminal (2) the device in FIG. 1A operates in a somewhat different fashion but is again responsive to a gating impulse on terminal (3) to assume a high conduction state. This polarity on terminals (1) and (2) tends to make the respective p-n junctions between layers 12 and 11 and layers 13 and 14, conductive. However, the n-p jnnction between layers 11 and 13 tends to block current flow through the device. Once again, it will be appreciated that in order to overcome this blocking condition it is necessary to either raise the voltage across the junction to a high enough value to force conduction thereacross or to extract current from gate terminal (3) in order to change the charge condition appearing at this junction.

The characteristic curves shown in the third quadrant of FIG. 1C illustrates device operation under the last mentioned condition. It will be seen that increasing the voltage between terminals (2) and (1) has little effect until the breakover voltage occurs at point A. After this, the current begins to increase and holes and electrons are redistributed within the various layers of the device when the device switches completely into high conduction.

The brief description hereinabove shows that the controlled bilateral device in FIG. 1A exhibits bi-directional current conducting characteristics and is operative under the control of appropriate polarity triggering impulses on terminal (3) to selectively furnish a low impedance path between terminals (1) and (2). A more detailed explanation of the functioning of such a device is available in the aforecited patent application of F. W. Gutzwiller, Serial No. 331,776, filed December 19, 1963.

*Power control circuits*

The foregoing general description of the operation of controlled bilateral devices will furnish the background for an appreciation of the unique circuitry to be described. In each of FIGURES 2 through 11 a single controlled bilateral semiconductor is used in combination with reactive circuit elements to selectively control the application of alternating current power to a load. The resulting circuits are unique in their efficiency of operation, their low required cost, and their simplicity. In order to facilitate cross-referencing between figures, components utilized in substantially similar manners in the various circuits are generally designated by the same numerals. Of course, it will be understood that this form of designation is not meant to imply that in every operating circuit the actual value of these components would be the same. Within the operating conditions hereinafter described, the particular values given to the circuit elements are dependent upon the specific operation desired and it is well within the scope of those skilled in the art to select appropriate values.

FIG. 2 illustrates a double resonant circuit for supplying alternating current to a load 32 having frequency and/or voltage requirements which exceed that of the supply source. Load 32 is serially connected with an inductance 33 across the alternating current source 31. A capacitor 34 is placed in parallel with load 32 and in combination with inductance 33 forms a first resonant circuit adapted to resonate at a frequency higher than the supply frequency. A second inductance 35 in series with a controlled bilateral semiconductor 30 is also connected across load 32. The impedance of inductance 35 in combination with that of capacitor 34 is selected to establish a resonant frequency that is higher than that of the LC combination comprising elements 33 and 34.

The operation of the described circuit for producing a voltage across load 32 that has a magnitude and frequency in excess of that of supply 31, will be understood if it is first assumed that the resonant frequency of the series combination made up of inductance 33 and 34 is sufficiently greater than the frequency of supply 31 that supply 31 during any half cycle of operation might be considered to be a direct current source. With this assumption, consider operation when the upper terminal of source 31 is positive and assume that it has a value of +E. Under these conditions, capacitor 34 is charged in series with inductance 33 until the upper plate thereof attains a value of +E volts. At this time, the voltage from source 31 can no longer cause current flow; however, because impedance 33 is an inductance, the collapsing field sustains the current flow and capacitor 34 continues charging until it attains a value of approximately +2E volts.

If the series circuit comprising capacitor 34, inductance 35, and semiconductor 30 is closed while capacitor 34 has a charge thereon, a relatively short time constant discharge path will be available for capacitor 34. Thus, assuming triggering of semiconductor 30 when capacitor 34 has a +2E voltage on its upper plate, a rapid discharge will occur until the current carrying terminals of semiconductor 30 are reverse-biased and it resumes its high impedance state. Under normal conditions, capacitor 34 will fully discharge through inductance 35 and semiconductor 30. Thereafter, because inductance 35 is in the circuit it will tend to maintain such current flow forcing the upper plate voltage to descend to a value approximating —2E volts. Semiconductor 30 then becomes nonconductive and the circuit is left with the upper terminal of capacitor 34 at —2E volts. Since a terminal voltage of +E was assumed to be provided by source 31, capacitor 34 will again charge, this time changing the magnitude of voltage on its plate by an amount equivalent to +3E. Once capacitor 34 is again recharged, triggering semiconductor 30 will furnish a low impedance discharge path and the aforedescribed sequence of operation will recur.

Reviewing the above operating sequence, it will be noted that inductance 33 charges capacitor 34 at a relatively slow rate. Once capacitor 34 is charged, inductance 35 and controlled semiconductor 30 discharge it at a relatively higher rate. These relative rates permit inductance 35 and semiconductor 30 to handle substantially all of the discharge current from capacitor 34 without interference from the shunting parallel path comprising the source 31 and inductance 33. Upon completion of the discharge action, capacitor 34 is again recharged by source 31 via inductance 33 for commencing the next cycle. The difference between the first and succeeding cycles is that as each succeeding cycle occurs, capacitor 34 has a higher voltage thereon. Selective triggering of semiconductor 30 is operative to control the magnitude of the voltage applied to the load. It will also be noted that the output frequency is substantially greater than that of the source frequency.

The described operating sequence assumed that a positive direct current was supplied by the upper terminal of source 31. With proper selection of resonant frequencies, an alternating current may be used rather than the postulated direct current. In order to permit such operation, however, it is essential that controlled semiconductor 30 be a bilateral device. Only if semiconductor 30 is bilateral will the same operating sequence be possible when the upper terminal of source 31 is experiencing the negative swing of the alternating current.

The triggering source 36 for semiconductor 30 is illustrated by a block in FIG. 2. The specific circuitry used to generate triggering impulses for semiconductor 30 is not germane to the invention. In fact, the particular nature of the control signal is selectively designed in accordance with the particular operating modes for which controlled semiconductor 30 has been designed. The frequency of the triggering pulses or signals is also not a critical factor and may vary from a repetition rate slightly less than the resonant frequency of elements 33 and 34 to a rate slightly below the resonant frequency of elements 34 and 35.

The particular value of the supply shown in FIG. 2 for fluorescent or mercury lamps should be apparent. As noted hereinbefore, such lamps often require a higher operating voltage than is available from the supply and they operate most efficiently from frequencies in excess of commercially available frequencies. In some arc discharge devices, such as these lamps, the negative resistance characteristic extends well into a high current region and it is desirable to limit the current flow therein during such conduction in order to stabilize operation.

FIG. 3 illustrates an embodiment of the invention operating upon the basic principles described with respect to FIG. 2 and including an added inductance 37 interconnected in series with load 32. This inductance does not affect the resonant circuits heretofore described but is effective to limit the amount of current flow in load 32 during high current conduction periods of load 32. It is also effective to prevent the load 32 from drawing current directly from source 31.

Figure 4:
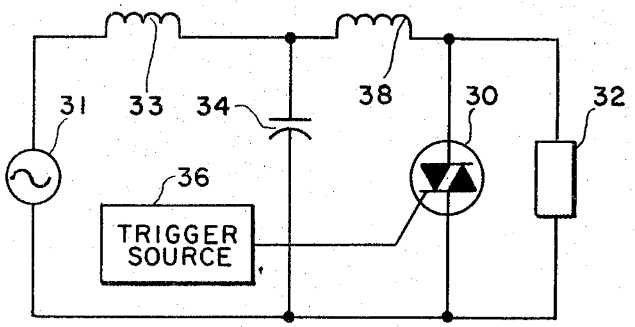
FIG. 4 is a circuit schematic illustrating an embodiment of the invention wherein alternating current is applied to a load via double resonant circuitry and wherein a single controlled bi-directional current conducting semiconductor is directly shunting the load.

FIG. 4 presents still another technique for solving the problem inherent in the supply of devices having negative resistance characteristics that extend into a high current region. In this case, the controlled bilateral device 30 is connected directly in parallel with the load 32 and the second resonant circuit is formed by placing an inductance 38 in the main series path between alternating current source 31 and load 32. Inductance 38, in view of its series interposition between the load and the supply, functions in a manner similar to that of inductance 37 in the circuit of FIG. 3. However, it also operates in combination with capacitor 34 to provide the second resonant circuit which permits the attainment of higher output voltages and frequencies. In this circuit as in those previously considered, the controlled bilateral device 30 is selectively triggered by trigger source 36 in order to control the amount of charge stored on capacitor 34 and thereby in order to control the energy supplied to load 32.

Figure 5:
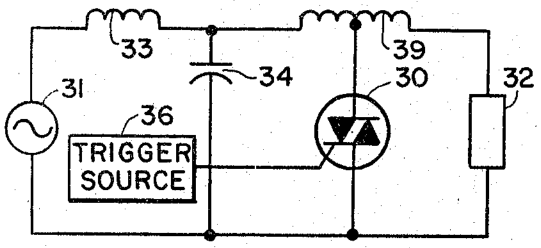
FIG. 5 is a circuit schematic illustrating an embodiment of the invention wherein alternating current is applied to a load via double resonant circuitry wherein a tapped inductance and a bi-directional current conducting semiconductor are combined to selectively prevent load current of one polarity for controlled periods.

The circuit in FIG. 5, though similar in many ways to those already discussed, utilizes a tapped inductance 39 in order to provide means for preventing load current during conduction of controlled bilateral device 30. This inductance replaces inductance 38 in FIG. 4 and semiconductor 30 is connected from the tap (e.g. a center tap) to one side of load 32. During a positive half cycle of operation when capacitor 34 discharges in the path comprising the lefthand portion of inductance 39 and controlled semiconductor 30, the righthand portion thereof generates by transformer action a bucking voltage in opposition to the supply during the initial portion of the discharge. Accordingly, no current is applied to load 32 during this conduction interval of the controlled bilateral device 30. It will be seen that a similar analysis will hold during the negative half cycle of operation.

Figure 6:
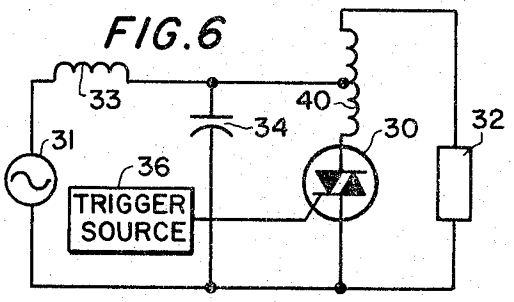
FIG. 6 is a circuit schematic illustrating an embodiment of the invention wherein alternating current is applied to a load via double resonant circuitry wherein a tapped inductance and a bi-directional current conducting semiconductor are combined to provide a controlled duration voltage pulse to the load.

FIG. 6 also teaches the use of a tapped inductance. In this case, the entire winding of a tapped inductance 40 is in series with bilateral device 30 across load 32, and capacitor 34 is connected to the tap thereon. With this circuit, a higher voltage pulse is applied to the load during conduction of semiconductor 30. Typically, this condition has been found useful for forcing lamp ionization after each reversal of polarity or in starting cold lamps. Circuit operation will be clear with the appreciation that upon conduction of semiconductor 30 the voltage induced by transformer action in the upper half of inductance 40 is in a direction to aid current supplied to the center tap from capacitor 34.

Figure 8:
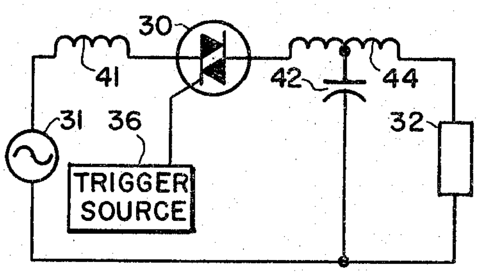
FIG. 8 is a circuit schematic illustrating an embodiment of the invention similar to that shown in FIG. 7 but differing in that a tapped inductance is used.

The circuits shown in FIGS. 7, 8 and 9 differ from those thus far described in that the controlled bilateral semiconductor 30 is connected in series with the load rather than in parallel. Accordingly, in FIG. 7, a first resonant circuit comprising an inductance 31, semiconductor 30, and a capacitor 42 is connected directly across the source of alternating current power 31. The load 32 is serially connected with an inductance 43 across capacitor 42. This circuit is particularly advantageous for supplying loads wherein upon operation, e.g., ionization of a lamp, the characteristic of the load switches to a low voltage high current condition.

In the circuit of FIG. 7, bilateral semiconductor 30 is used to control the charging of capacitor 42 rather than for controlling the discharge of a capacitor as in the previously described circuits. The arrangement herein is such that the resonant frequency of elements 41 and 42 will be higher than that of elements 42 and 43 because sufficient time must be available for commutation of the semiconductor 30 after it is triggered into conduction. In other words, inductance 43 must be of sufficient magnitude to ensure this commutation.

The circuits of FIGS. 7, 8 and 9 are capable of a second mode of operation wherein inductor 41 and supply 31 are of sufficient magnitude to provide normal operation of load 32 with device 30 continuously conductive. The amount of energy delivered to the load may then be controlled by selectively triggering the semiconductor device 30 into conduction at various phase angles on each half cycle of the supply voltage, thus providing a form of phase control of the load. The resonant action of inductor 41 and capacitor 42 is such that when device 30 is triggered into conduction, the voltage on capacitor 42 will attempt to rise to twice the supply voltage at that instant, thus enhancing conduction of current through the load 32. In the case where load 32 is a gaseous discharge device such as a mercury arc lamp, the starting condition is a very high impedance which requires a voltage much higher than normal to initiate conduction. With the semiconductor device 30 triggered once each half cycle, the voltage across capacitor 42, and hence load 32, will increase in magnitude with each reversal (each half cycle) until the load is rendered conductive or until the breakover voltage of the semiconductor is reached and prevents any further increase in voltage.

The circuit in FIG. 8 may be considered as somewhat analogous to that shown in FIG. 5. A difference exists in that controlled semiconductor 30 is now serially connected with load 32 and inductances 41 and 44 across the supply 31. It is accordingly in direct control over the charging of capacitor 42. The amount of energy delivered to the load is determined by the amount of charge originally permitted to accumulate on capacitor 42. Furthermore, there is no continuing accumulation of charge on capacitor 42 (i.e., above the level +2E of the earlier example), because the maximum charge value which may be developed upon capacitor 42 with this arrangement is substantially equal to twice the supply voltage. It will be appreciated that by means of the tapped inductance 44 in FIG. 8, commutation of semiconductor 30 is more easily facilitated and that the lamp load is deenergized during conduction.

By adding an additional capacitor to the circuit shown in FIG. 8 and rearranging the connections of tapped inductance it is possible to provide high voltage pulses to assist in the initial ionization of lamp loads. FIG. 9 illustrates such a circuit. A capacitor 46 is connected between the junction of inductance 41 and semiconductor 30 and the opposite terminal of supply 31. Semiconductor 30 is connected to the tap on an inductance 45 and capacitor 47 is serially connected with the entire inductance across load 32. At the instant semiconductor 30 is triggered into conduction, the instantaneous difference in voltages across capacitors 46 and 47 is applied to the tapped portion of inductor 45 which then serves as an autotransformer to create a higher voltage which is applied to load 32. In a circuit of this nature, capacitor 46 would be smaller than capacitor 47.

Two additional circuits are shown in FIGS. 10 and 11 for controlled dimming of lamp loads. In these circuits, control over the power delivered to the lamps is established by means of a bilateral device 30 in conjunction with the lamp ballast. In FIG. 10, bilateral semiconductor 30 is used in series with the secondary 48 of ballast 50 and lamp 52. The circuit connections also include the connection of the primary 49 of the ballast transformer directly across supply 31. In this arrangement, the leakage reactance between the primary and secondary winding provides a current limiting function. During normal operation, the primary winding is energized continuously; however, power is applied to the lamp only when bilateral device 30 is triggered to a conductive state. At this time, A.C. power is applied to the lamp 52 from source 31 directly, and also as a result of the inductance between primary winding 49 and secondary winding 48.

FIG. 11 shows a circuit for controlled dimming of a gas lamp with a constant current ballast 50, wherein the controlled bilateral device 30 is used to by-pass current around the lamp during a phase controlled portion of each half cycle. In this circuit, the primary winding 49 is again directly connected across the load and the secondary winding 48 is connected in series with a capacitor 51 and lamp 52 across supply 31. As shown herein, controlled bilateral device 30 is directly connected across the lamp and consequently, during its conduction period, short circuits any power applied thereto.

A number of circuits have been shown and described for controlling the alternating current power applied to a load. In these circuits, a controlled bilateral semiconductor has been used in conjunction with reactive elements in order to perform an inversion function wherein the output has a frequency and a voltage which may differ from the input. Each of these circuits represents a particular embodiment of the invention. It will, of course, be understood that it is not wished to be limited to these specific embodiments since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. A circuit for supplying power to a load from an alternating current source comprising: a controlled bilateral semiconductor having an input terminal, an output terminal and a gate terminal, said input and output terminals normally exhibiting a high impedance therebetween and presenting a low impedance therebetween in response to a triggering signal; a triggering signal means coupled with said gate terminal of said controlled bilateral semiconductor; an energy storage element; a first and a second inductive reactor; first circuit means connecting said first inductive reactor, said energy storage element, and said alternating current source in a first closed, tuned oscillatory circuit loop; second circuit means connecting the input and output terminals of said controlled bilateral semiconductor; at least a portion of said second inductive reactor, and the load in a second closed, tuned oscillatory circuit loop; and means coupling said second closed, tuned oscillatory circuit loop with at least said energy storage element of said first closed, tuned oscillatory circuit loop so that the power supplied to the load is determined by the relationship between the time of occurrence of the triggering signals and the phase of the current from the alternating current source.

2. In the circuit as set forth in claim 1 wherein said controlled bilateral semiconductor and at least a portion of said second inductive reactor is connected in shunt with the load.

3. A circuit as defined in claim 1 wherein said energy storage means is connected in a circuit branch common to both said first and second oscillatory circuit loops.

4. A circuit as defined in claim 1 wherein said energy storage means is comprised of a capacitor.

5. A circuit as defined in claim 1 wherein at least a portion of said second inductive reactor is serially connected with said bi-directional current conducting semiconductor across said energy storage means.

6. A circuit as defined in claim 1 wherein said second inductive reactor includes a first and second portion, said bi-directional current conducting semiconductor is serially connected with said first portion across said energy storage means, and said load is serially connected with said second portion of said inductive reactor across said energy storage means.

7. A circuit for supplying power to a load from an alternating current source comprising: a controlled bilateral semiconductor having an input terminal, an output terminal and a gate terminal, said input and output terminals normally exhibiting a high impedance therebetween and presenting a low impedance therebetween in response to a triggering signal; a triggering signal means coupled with said gate terminal of said controlled bilateral semiconductor; an energy storage element; a first and a second inductive reactor; first circuit means connecting said first inductive reactor, the input and output terminals of said controlled bilateral semiconductor, said energy storage element, and said alternating current source in a first closed, tuned oscillatory circuit loop; second circuit means connecting at least a portion of said second inductive reactor, the load, and said energy storage element of said first closed, tuned oscillatory circuit loop in a second closed, tuned oscillatory circuit loop so that the power supplied to the load is determined by the relationship between the time of occurrence of the triggering signals and the phase of the current from the alternating current source.

8. A circuit as defined in claim 7 wherein said energy storage means is a capacitor and said bi-directional current conducting semiconductor connected in said first closed, tuned oscillatory circuit loop controls the charging of said capacitor and the energy delivered from the alternating current source to the load in accordance with the time occurrence of the triggering signals.

9. A circuit as defined in claim 7 wherein said triggering signal means coupled with said bi-directional current conducting semiconductor controls the transfer of energy between said first and second closed, tuned oscillatory circuit loops.

10. A circuit as defined in claim 7 wherein said bi-directional current conducting semiconductor is serially connected with said energy storage means.

11. A circuit as defined in claim 7 wherein at least a portion of said second inductive reactor is serially connected with said load and said serially connected second reactor and load are connected across said energy storage means.

12. A circuit as defined in claim 7 wherein said energy storage means is connected in a circuit branch common to both said first and second oscillatory circuit loops.

References Cited by the Examiner

UNITED STATES PATENTS

| | | | |
|---|---|---|---|
| 2,889,460 | 6/1959 | Ehret | 331—114 X |
| 3,123,750 | 3/1964 | Hutson et al. | 307—88.5 X |
| 3,188,490 | 6/1965 | Hoff et al. | 307—88.5 |

OTHER REFERENCES

Von Zastrow, E. E., "Power and Control Circuits." Appearing in Electronics, December 6, 1963. Pages 57 and 58.

JOHN W. HUCKERT, *Primary Examiner.*

D. O. KRAFT, *Assistant Examiner.*